United States Patent
Mizuguchi

(10) Patent No.: US 7,324,784 B2
(45) Date of Patent: Jan. 29, 2008

(54) TRANSMISSION BEAM CONTROL METHOD, ADAPTIVE ANTENNA TRANSMITTER/RECEIVER APPARATUS AND RADIO BASE STATION

(75) Inventor: Hironori Mizuguchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 197 days.

(21) Appl. No.: 10/548,674

(22) PCT Filed: Mar. 9, 2004

(86) PCT No.: PCT/JP2004/003034

§ 371 (c)(1),
(2), (4) Date: Sep. 8, 2005

(87) PCT Pub. No.: WO2004/082173

PCT Pub. Date: Sep. 23, 2004

(65) Prior Publication Data

US 2006/0211439 A1    Sep. 21, 2006

(30) Foreign Application Priority Data

Mar. 12, 2003 (JP) .............................. 2003-066566

(51) Int. Cl.
*H04B 1/00* (2006.01)
(52) U.S. Cl. ..................... 455/63.4; 455/25; 342/359
(58) Field of Classification Search ............. 455/115.1, 455/25, 115.2, 279.1, 65, 63.4, 67.11, 515, 455/522, 562.1; 342/359, 360, 367, 139
See application file for complete search history.

(56) References Cited

U.S. PATENT DOCUMENTS

| 6,754,467 B1 * | 6/2004 | Ide et al. .................... 455/25 |
| 6,845,244 B2 * | 1/2005 | Ide et al. .................... 455/506 |
| 6,937,874 B2 * | 8/2005 | Cramer, III ................. 455/522 |

FOREIGN PATENT DOCUMENTS

JP    09-233015 A    9/1997

(Continued)

OTHER PUBLICATIONS

NTT DoCoMo Technical Journal, vol. 8, No. 1, Apr. 2000.

(Continued)

*Primary Examiner*—Edward F. Urban
*Assistant Examiner*—Christian A. Hannon
(74) *Attorney, Agent, or Firm*—Sughrue Mion, PLLC

(57) ABSTRACT

Changes in instructions for increasing/decreasing transmission power that have been decoded from TPC bits are monitored, and when the increase/decrease instructions in a prescribed time interval are biased toward instructions for increasing the transmission power, the peak direction or main lobe width of the transmission beam is changed by regulating the transmission power or transmission antenna weights that correspond to each of a plurality of antenna devices. These processes are repeated until the bias toward instructions for increasing the transmission power in the instructions for increasing/decreasing transmission power is eliminated or until the number of changes of the transmission beam reaches a maximum value that has been set in advance.

17 Claims, 10 Drawing Sheets

FOREIGN PATENT DOCUMENTS

| | | |
|---|---|---|
| JP | 2000-174678 A | 6/2000 |
| JP | 2002-026789 A | 1/2002 |
| JP | 2002-076742 A | 3/2002 |
| JP | 2002-290135 A | 10/2002 |
| JP | 2002-314320 A | 10/2002 |
| JP | 2002-359513 A | 12/2002 |
| JP | 2003-060549 A | 2/2003 |
| JP | 2003-060558 A | 2/2003 |
| WO | WO 01-95427 A2 | 12/2001 |
| WO | WO 02/15432 A1 | 2/2002 |

OTHER PUBLICATIONS

S. Tanaka, M. Sawahashi, and F. Adachi, "Pilot symbol-assisted decision directed coherent adaptive array diversity for DS-CDMA mobile radio reverse link," IEICE Trans. Fundamentals, vol. E80-A, pp. 2445-2454, Dec. 1997.

Tanaka, Harada, Ihara, Sawahashi, Adachi, "Outdoor test characteristics of adaptive antenna array diversity reception in W-CDMA," Shingaku Gihou, RCS99-127, pp. 45-50, Oct. 1999.

* cited by examiner

TRANSMISSION BEAM CONTROL METHOD, ADAPTIVE ANTENNA TRANSMITTER/RECEIVER APPARATUS AND RADIO BASE STATION

TECHNICAL FIELD

The present invention relates to transceiving device that is suitable for use in a Code Division Multiple Access (hereinbelow abbreviated as CDMA) mobile communication system.

BACKGROUND ART

In a CDMA mobile communication system, a plurality of mobile stations typically use the same frequency band to perform radio communication, and wave interference caused by the radio communication by other mobile stations, i.e., multi-user interference, is a chief cause of limitation of the subscriber capacity of a mobile communication system. To increase the subscriber capacity, the adaptive antenna technology is effective for suppressing interference waves during reception, and during transmission, for avoiding transmission in unnecessary directions and thus reducing interference power that is applied to other mobile stations.

As a prior-art example of a transceiving device that adopts the adaptive antenna technology (hereinbelow referred to as an adaptive antenna transceiving device), a technology that uses a plurality of antenna devices for controlling directivity is described in non-patent document 1 (NTT DoCoMo Technical Journal, Vol. 8, No. 1, April 2000). Non-patent document 1 discloses increasing antenna gain in the direction of a mobile station by conferring weight coefficients (reception antenna weights) to each of received signals that are received by a plurality of antenna devices during reception, and during transmission, directing the transmission beam toward the mobile station that is the object of transmission by multiplying weight coefficients (transmission antenna weights) that are generated based on the reception antenna weights by the transmission data for each antenna device.

As a method of generating the reception antenna weights, a method is described in non-patent document 2 (S. Tanaka, M. Sawahashi, and F. Adachi, "Pilot symbol-assisted decision directed coherent adaptive array diversity for DS-CDMA mobile radio reverse link," IEICE Trans. Fundamentals, Vol. E80-A, pp. 2445-2454, December 1997) for implementing control so as to minimize the mean-squared-error between a pilot symbol after despreading and a signal after RAKE synthesis that is generated by referring to information data symbols that have been provisionally determined. In addition, non-patent document 3 (Tanaka, Harada, Ihara, Sawahashi, Adachi, "Outdoor test characteristics of adaptive antenna array diversity reception in W-CDMA," Shingaku Gihou, RCS99-127, pp. 45-50, October 1999) describes an example of using the transmission antenna weights that are generated based on the above-described reception antenna weights in downlink transmission (transmission in the direction from the radio base station to a mobile station).

In a CDMA mobile communication system, transmission power control (hereinbelow abbreviated as TPC) is generally implemented to ensure transmission quality while avoiding unnecessary interference to other mobile station. In particular, the TPC technology is indispensable in CDMA because common frequency interference is produced by the assignment of a common frequency to a plurality of mobile stations.

The relation between TPC and a transmission beam in downlink transmission is next considered as an example.

In downlink transmission, the directivity of the transmission beam is controlled by using a plurality of antenna devices that are provided in a radio base station and multiplying the transmission antenna weights of each by transmission data. A mobile station instructs the radio base station to reduce the transmission power if the reception quality exceeds a desired value and instructs the radio base station to increase the transmission power if the reception quality falls below the desired value. The instructions to increase or decrease the transmission power (hereinbelow referred to as increase/decrease instructions) from the mobile station to the radio base station use TPC bits that are included in frames that are transmitted from the mobile station to the radio base station in each of prescribed cycles. The radio base station extracts the TPC bits from the frames that are transmitted from the mobile stations and increases or decreases the transmission power to that mobile station in accordance with the instructions.

The following explanation regards an adaptive antenna transceiving device of the prior art with reference to FIG. 1. The adaptive antenna transceiving device that is shown in FIG. 1 is an example of the configuration for executing TPC in the adaptive antenna transceiving device that is described in FIG. 1 of non-patent document 1.

As shown in FIG. 1, this adaptive antenna transceiving device of the prior art is a configuration that includes: a plurality (N, where N is a positive integer) of antenna devices 301_1-301_N that are arranged in an array; receiving-side multipliers 302_1-302_N for multiplying reception antenna weights by the received signals that have been received by antenna devices 301_1-301_N; adder 303 for adding (synthesizing) the plurality of received signals that have been multiplied by the reception antenna weights and supplying the result as reproduction data; reception antenna weight generation circuit 304 for, based on the reproduction data that have been supplied as output from adder 303, calculating the optimum reception antenna weights that are to be multiplied by the received signals that have been received by each of antenna devices 301_1-301_N and supplying the results to each of corresponding receiving-side multipliers 302_1-302_N; TPC bit decoding circuit 307 for extracting TPC bits from the reproduction data and then decoding these TPC bits to supply instructions to increase or decrease transmission power; antenna weight conversion circuit 305 for, based on the reception antenna weights that have been generated by reception antenna weight generation circuit 304, generating transmission antenna weights, and further, increasing or decreasing the transmission antenna weight in accordance with the instructions to increase or decrease transmission power that have been supplied as output from TPC bit decoding circuit 307; and transmission-side multipliers 306_1-306_N for multiplying transmission antenna weights that have been supplied as output from antenna weight conversion circuit 305 by transmission data and supplying the products to antenna devices 301_1-301_N. The adaptive antenna transceiving device that is shown in FIG. 1 shows the configuration of a baseband signal processor that performs signal processing of principally baseband transmission/reception data. The adaptive antenna transceiving device includes a radio signal transceiver (not shown) that is provided with an RF receiver for converting radio frequency signals that are received by antenna devices to baseband signals and an RF transmitter for converting baseband signals to radio frequency signals.

In this configuration, antenna weight conversion circuit 305, based on the weight coefficients (reception antenna weights) that have been generated at reception antenna weight generation circuit 304, generates transmission antenna weights for transmitting in the same direction as the directivity when receiving. In addition, antenna weight conversion circuit 305 controls the transmission power by regulating each transmission antenna weight in accordance with the instructions to increase or decrease transmission power that have been decoded at TPC bit decoding circuit 307.

Generally, reasons that can be considered for increasing the transmission power of the radio base station include cases in which the reception quality of the mobile station deteriorates due to shielding when the radio base station and mobile station are blocked by, for example, buildings, or cases in which the transmission power is increased to compensate for a drop in the reception quality of the mobile station that is the object of transmission (hereinbelow referred to as the "desired wave mobile station") because the peak direction of the transmission beam that is formed at the radio base station diverges from the desired wave mobile station.

When the peak direction of the transmission beam diverges from the desired wave mobile station, the reception quality of the desired wave mobile station achieves the desired value through the TPC process, but when another mobile station is present in the peak direction of the transmission beam, unnecessary interference power is applied to this mobile station, and the transmission power must therefore be increased to each mobile station. The maximum transmission power of a radio base station is normally limited by the capability of the power amplifier that supplies power to the antenna devices, and an increase in the transmission power to each mobile station therefore reduces the subscriber capacity that can be accommodated by the mobile communication system.

It is an object of the present invention to provide an adaptive antenna transceiving device that can reduce unnecessary interference power that is applied to other mobile stations due to divergence of the peak direction of a transmission beam from the mobile station that is the object of transmission when applying TPC in downlink transmission, and thus, that can prevent the reduction of the subscriber capacity of a mobile communication system.

DISCLOSURE OF THE INVENTION

In the present invention for achieving the above-described object, changes in instructions to increase or decrease transmission power that are decoded from TPC bits are monitored, and when increase/decrease instructions are biased toward instructions for increasing the transmission power in a prescribed interval that has been determined in advance, the transmission antenna weights or the transmission power of each antenna device are adjusted to change the peak direction or the main lobe width of the transmission beam. These processes are repeated until the bias in increase/decrease instructions toward instructions for increasing the transmission power is eliminated, or until the number of changes of the transmission beam reaches a predetermined maximum value.

When the peak direction of the transmission beam has been changed, the peak direction of the transmission beam can be corrected toward the direction of the mobile station that is the object of transmission. Alternatively, when the width of the main lobe of the transmission beam is increased, the reception power of the mobile station is increased despite slight deviation of the peak direction of the transmission beam from the mobile station that is the object of transmission.

The consequent reduction of increases in transmission power that are caused when the peak direction of the transmission beam diverges from the mobile station that is the object of transmission enables a reduction of the interference power that is applied to other mobile stations that are present in the peak direction and can prevent a drop in the subscriber capacity of the system.

BEST MODE FOR CARRYING OUT THE INVENTION

The following explanation regards the present invention with reference to the accompanying figures.

First Embodiment

Figure 2:
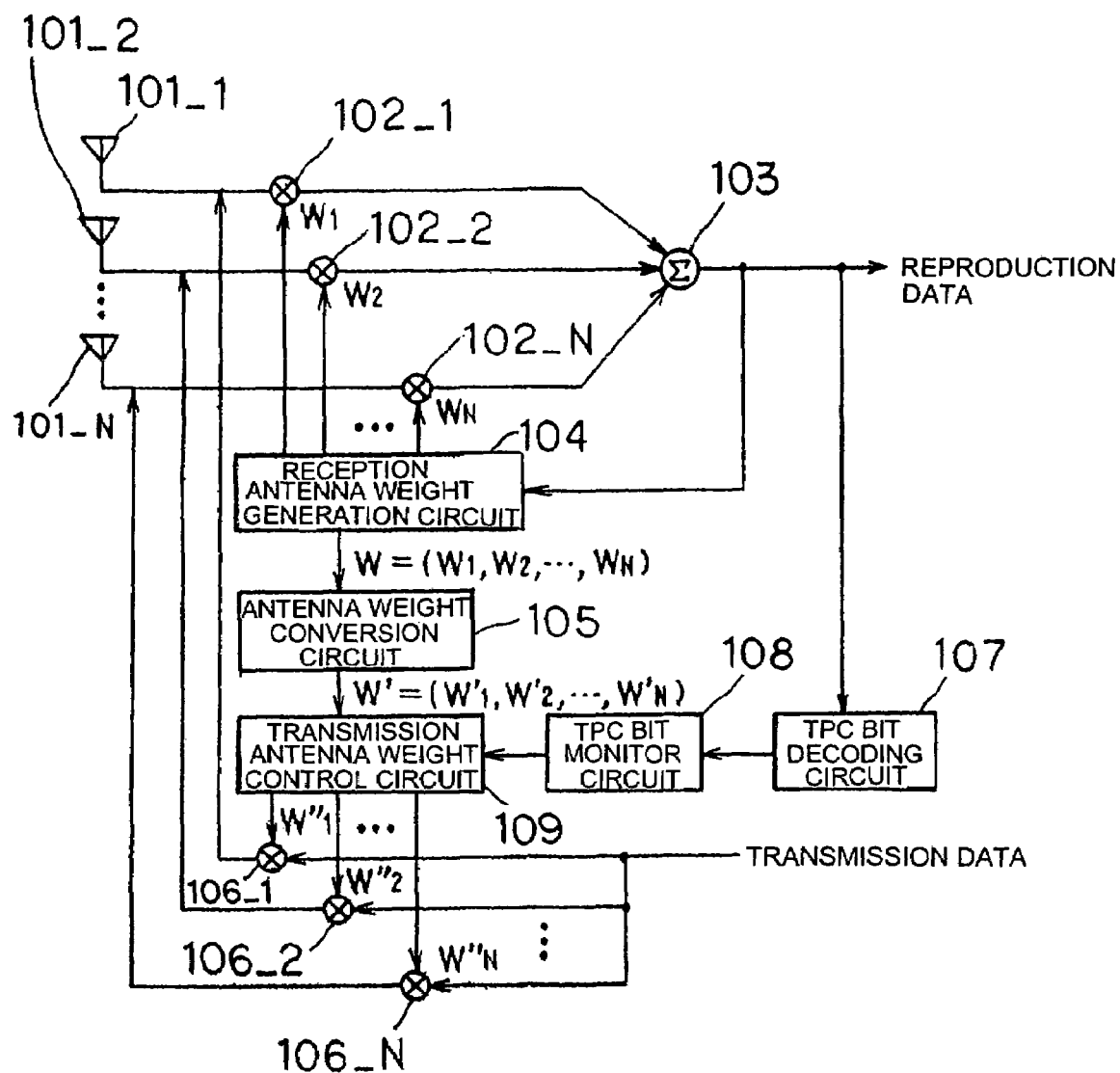
FIG. 2 is a block diagram showing the configuration of the first embodiment of the adaptive antenna transceiving device of the present invention.

As shown in FIG. 2, the transceiving device of the first embodiment includes: a plurality (N, where N is a positive integer) of antenna devices 101_1-101_N that are arranged in an array; receiving-side multipliers 102_1-102_N for multiplying reception antenna weights by received signals that have been received by antenna devices 101_1-101_N; adder 103 for adding (synthesizing) the plurality of received signals that have been multiplied by reception antenna weights and supplying the results as reproduction data; reception antenna weight generation circuit 104 for, based on the reproduction data that have been supplied as output from adder 103, calculating optimum reception antenna weights that are to be multiplied with received signals that have been received, and for supplying these optimum reception antenna weights to corresponding receiving-side multipliers 102_1-102_N; TPC bit decoding circuit 107 for extracting TPC bits from reproduction data and decoding instructions for increasing or decreasing transmission power; TPC bit monitor circuit 108 for monitoring changes of the instructions for increasing or decreasing transmission power that have been decoded by TPC bit decoding circuit 107 in prescribed intervals and detecting whether or not a bias exists for instructions for increasing the transmission power; antenna weight conversion circuit 105 for, based on the reception antenna weights that have been generated by reception antenna weight generation circuit 104, generating first transmission antenna weights; transmission antenna weight control circuit 109 for controlling first transmission antenna weights based on the monitoring results of TPC bit monitor circuit 108 and supplying the results as second transmission antenna weights; and transmission-side multipliers 106_1-106_N for multiplying second transmission antenna weights that have been supplied as output from transmission antenna weight control circuit 109 with transmission data and supplying the products to antenna devices 101_1-101_N.

As with the prior art, the adaptive antenna transceiving device that is shown in FIG. 2 shows the configuration of a baseband signal processor for realizing signal processing of mainly baseband transceiving data. The adaptive antenna transceiving device includes radio signal transceiver (not shown) that is provided with an RF receiver for converting radio frequency signals that have been received by antenna devices 101_1-101_N to baseband signals and an RF transmitter for converting baseband signals to radio frequency signals. The baseband signal processor may be constituted by a semiconductor integrated device that realizes the functions of each of the above-described constituent elements by, for example, logic circuits, or may be constituted by a DSP or CPU. When the baseband signal processor is constituted by a DSP or CPU, the processing described below of each of the constituent elements with the exception of the antenna devices is executed in accordance with a program stored in advance in a storage device.

Reception antenna weight generation circuit 104 executes, for example, an MMSE (Minimum Mean Squared Error) process that updates reception antenna weights such that the mean squared error between reproduction data that have been supplied as output from receiving-side adder 103 and a predetermined reference signal (desired signal waveform) is minimized. Algorithms such as the LMS (Least Mean Square) algorithm or RLS (Recursive Least Square) algorithm are known algorithms for realizing an MMSE process, and no particular limitation is placed on the algorithm that is used in reception antenna weight generation circuit 104 in the present embodiment.

Reception antenna weights $W=(w_1, w_2, \ldots, w_N)$ that are generated in reception antenna weight generation circuit 104 are supplied to each of receiving-side multipliers 102_1-102_N and antenna weight conversion circuit 105.

Antenna weight conversion circuit 105 generates transmission antenna weights (first transmission antenna weights) $W'=(w'_1, w'_2, \ldots, w'_N)$ based on the reception antenna weights $W=(w_1, w_2, \ldots, w_N)$ that are generated in reception antenna weight generation circuit 104. Antenna weight conversion circuit 105 is a device that is provided in correspondence with each antenna device for executing a process for correcting the amplitude/phase deviation between a plurality of radio signal transceivers that are not shown in FIG. 2, or a process for correcting the difference between frequencies when the frequencies of the transmission waves and reception waves are different as in the well-known FDD (Frequency Division Duplex) system. Antenna weight conversion circuit 105 generates first transmission antenna weights $W'=(w'_1, w'_2, \ldots, w'_N)$ for forming a transmission beam having a directivity that is basically the same as the directivity during reception.

TPC bit decoding circuit 107 extracts TPC bits from the reproduction data and supplies the decoded instructions for increasing/decreasing the transmission power that have been transmitted from the mobile station.

Figure 3A:
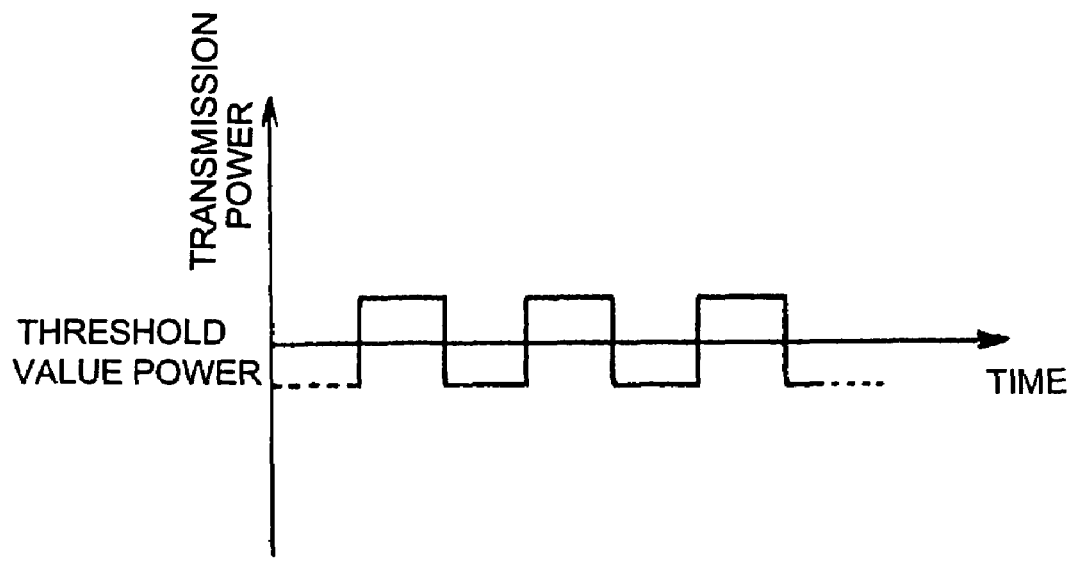
FIG. 3A is a schematic view showing the change in transmission power during application of TPC when the peak direction of a transmission beam is directed toward a mobile station.

TPC bit monitor circuit 108 monitors the changes in prescribed intervals in the instructions for increasing/decreasing the transmission power that have been decoded by TPC bit decoding circuit 107. The TPC bit decoding results are assumed to repeat in order between instructions for decreasing and instructions for increasing the transmission power when the peak direction of the transmission beam is correctly directed toward the desired wave mobile station. In other words, within a prescribed time interval that has been determined in advance, the transmission power from a radio base station to a desired wave mobile station repeatedly increases and decreases with a particular transmission power (the threshold value power) as center, as shown in FIG. 3A. In this case, the number of instructions for increasing and the number of instructions for decreasing in the TPC bits are substantially identical in the prescribed time interval.

Figure 3B:
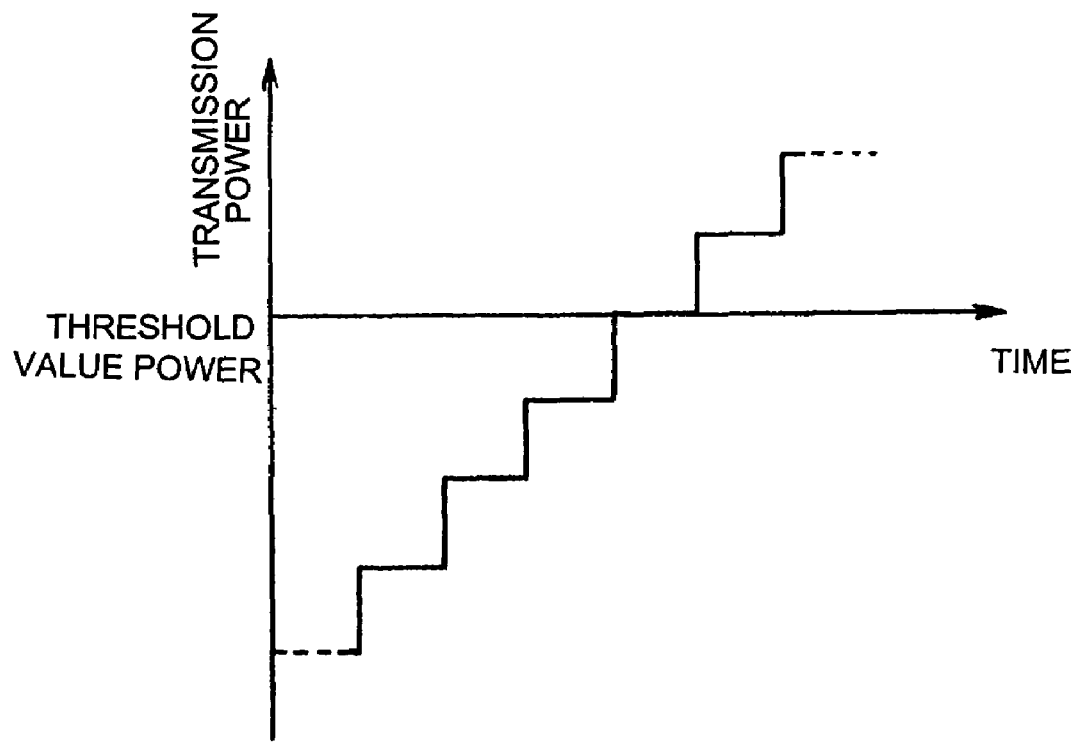
FIG. 3B is a schematic view showing the change in transmission power during application of TPC when the peak direction of a transmission beam diverges from the mobile station.

On the other hand, if the peak direction of the transmission beam diverges from the direction of the desired wave mobile station, it is assumed that the desired wave mobile station will continue to request the radio base station for an increase in transmission power until the desired reception quality is obtained, and instructions for increase will be continuously supplied as output from the decoding results of TPC bits. In other words, the transmission power from the radio base station to the desired wave mobile station will continuously increase in steps in the prescribed time intervals as shown in FIG. 3B. In this case, the desired wave mobile station finally obtains the desired reception quality, but other mobile stations that are present in the peak direction of the transmission beam that is formed by the radio base station directly receive unnecessary interference power, and the reception quality is therefore greatly degraded.

As a countermeasure for this problem, in the present embodiment, the peak direction of the transmission beam is moved to the right and left by transmission antenna weight control circuit 109 when the results of decoding TPC bits within a prescribed time interval are biased toward instructions for increasing the transmission power. More specifically, second transmission antenna weights $W''=(w''_1, w''_2, \ldots, w''_N)$ are generated such that the peak direction moves to the right or to the left with respect to the transmission beam that is formed by first transmission antenna weights $W'=(w'_1, w'_2, \ldots, w'_N)$. These second transmission antenna weights cause the increase or decrease of the amplitude of the transmission data to thus control the peak direction of the transmission beam. This process is executed until the bias toward instructions for increasing the transmission power in the results of decoding TPC bits is eliminated, or until the number of movements of the peak direction reaches a maximum value that has been set in advance. Transmission antenna weight control circuit 109 of the present embodiment is provided with a register for holding each of the values of angle L, which is the unit of movement when moving the peak direction to the right or left, variable K (initial value=0) that indicates the number of movements, and Kmax, which is the maximum number of changes (the maximum value of the number of movements).

Figure 1:
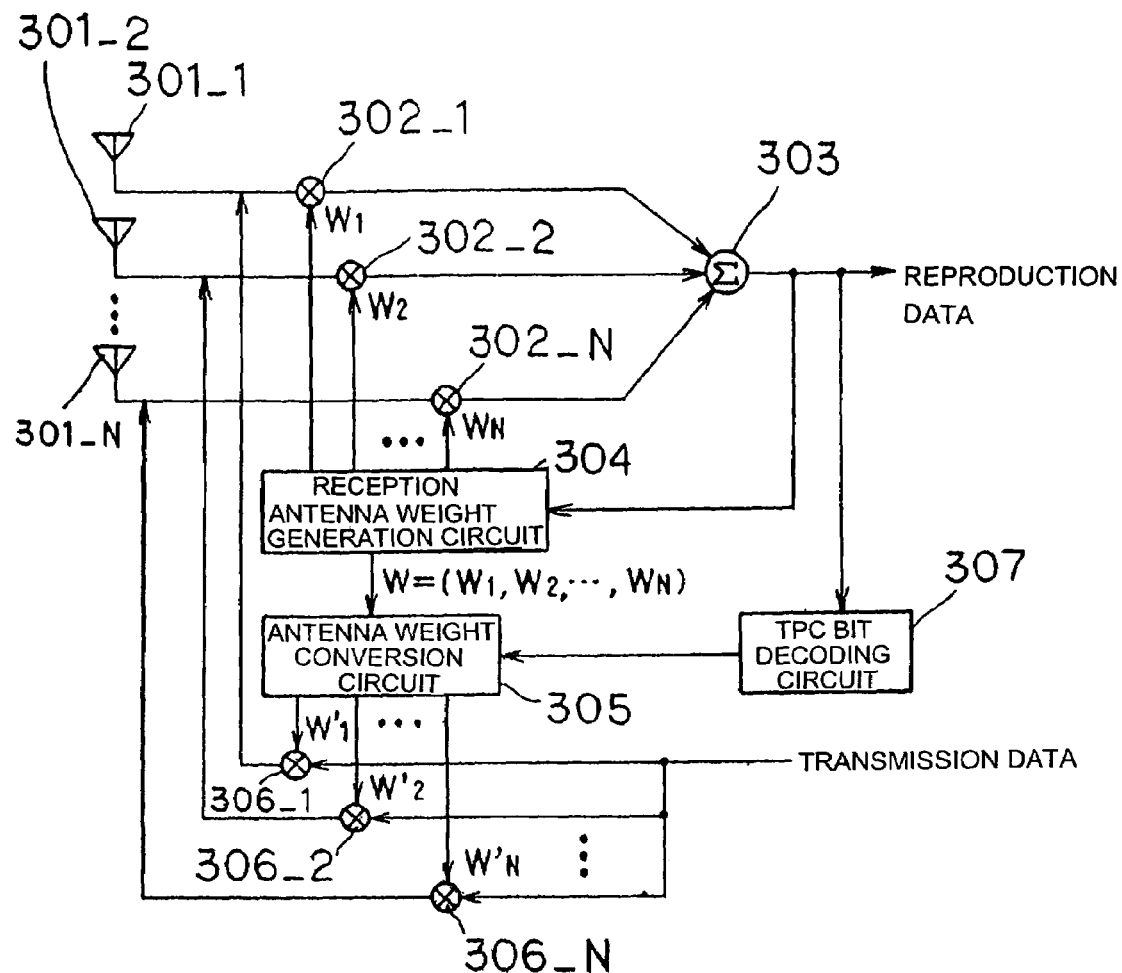
FIG. 1 is a block diagram showing the configuration of an adaptive antenna transceiving device of the prior art.

The configuration and operations of each of receiving-side multipliers 102_1-102_N, adder 103, reception antenna weight generation circuit 104, and transmission-side multipliers 106_1-106_N are the same as for the adaptive antenna transceiving device of the prior art that was shown in FIG. 1, and an explanation of the configuration and operations is therefore here omitted.

Figure 4:
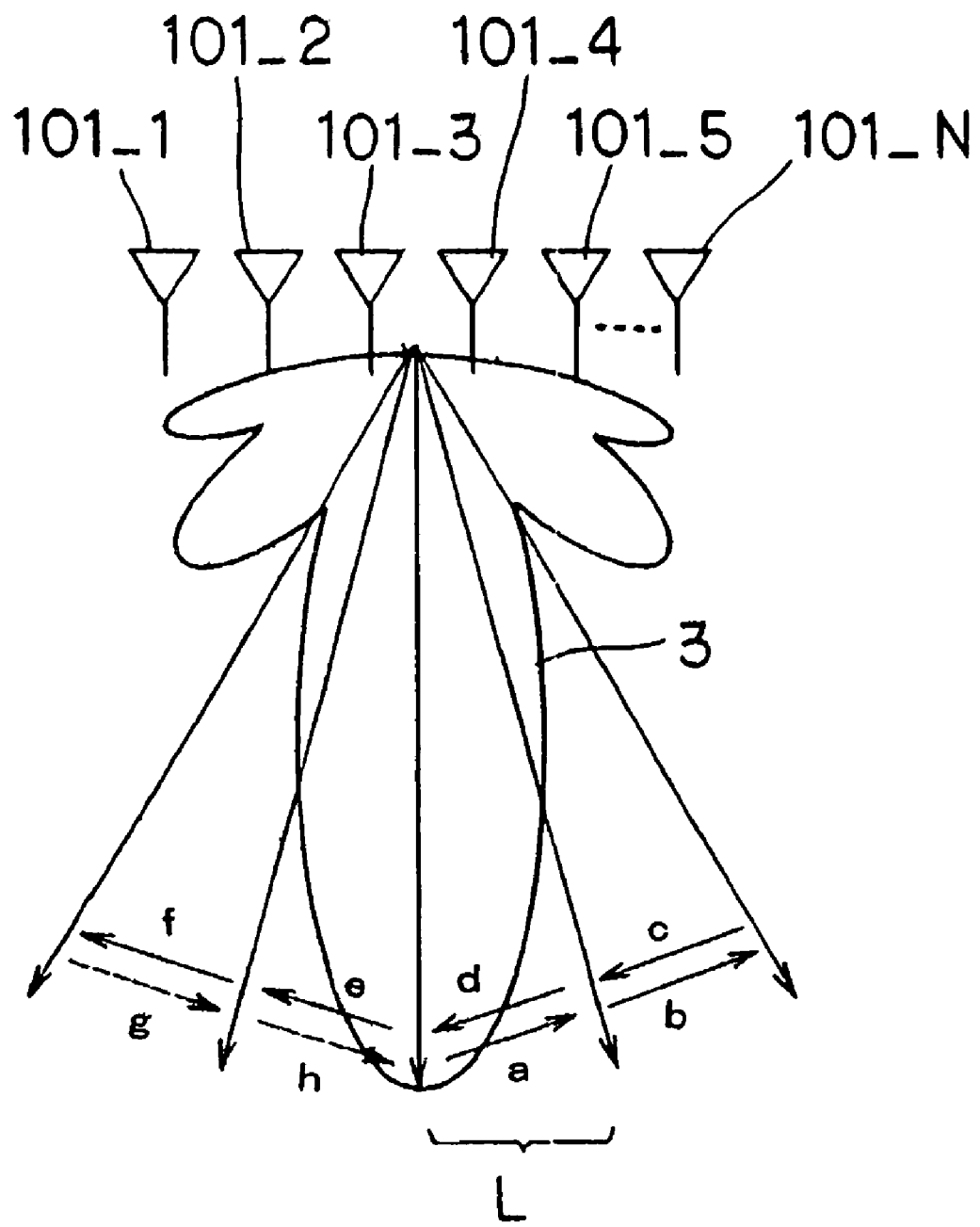
FIG. 4 is a schematic view showing the transmission beam control method of the adaptive antenna transceiving device of the first embodiment.
Figure 5:
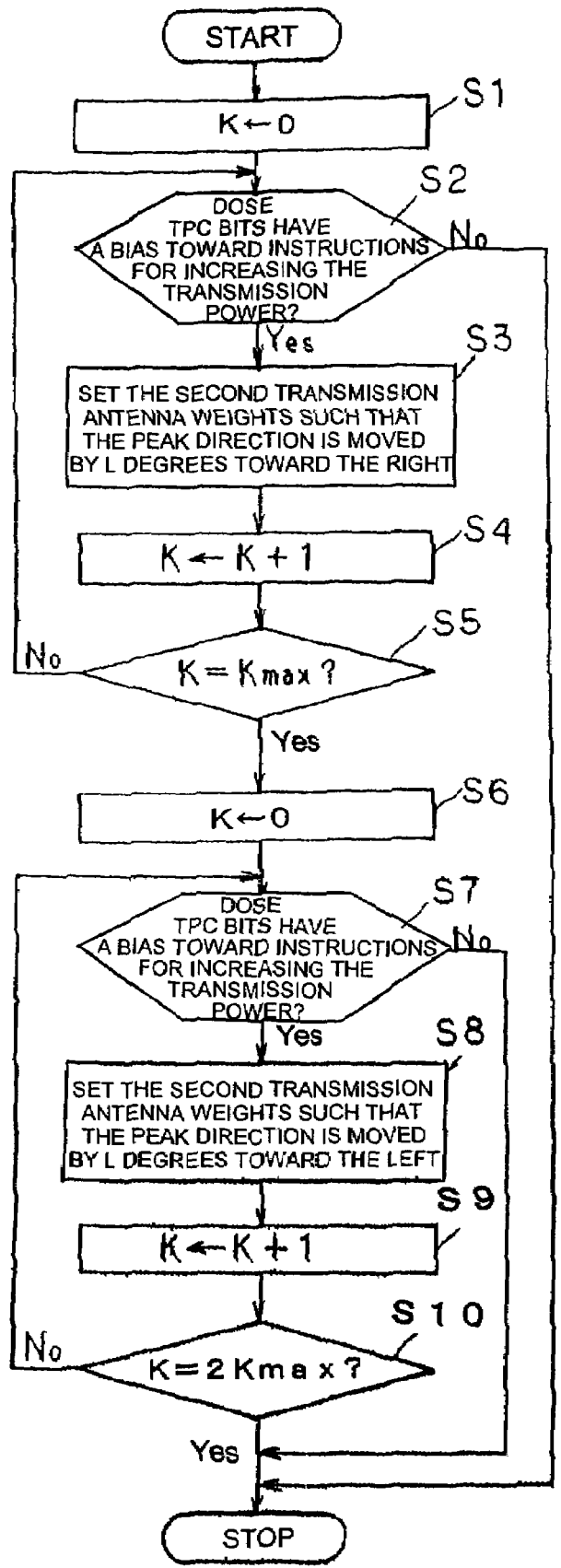
FIG. 5 is a flow chart showing the procedures of the transmission beam control method that is shown in FIG. 4.

The following explanation regards the method of controlling the transmission beam by means of the adaptive antenna transceiving device of the present embodiment with reference to FIGS. 4 and 5.

As shown in FIG. 4, in the adaptive antenna transceiving device of the present embodiment, the peak direction is moved a predetermined angle L toward the right (or left) with respect to the direction (initial position) of transmission beam 3 that is formed by first transmission antenna weights $W'=(w'_1, w'_2, \ldots, w'_N)$ when the results of decoding TPC bits in a prescribed time interval are biased toward instructions for increasing the transmission power ("a" of FIG. 4). Then, if conditions do not improve (the results of decoding TPC bits are biased toward instructions for increasing transmission power), the peak direction is further moved by angle L toward the right (or left) ("b" of FIG. 4). The same process is repeated up to a maximum number of changes Kmax that has been set in advance.

If the conditions do not improve despite the maximum number of changes Kmax of movements of the peak direction of the transmission beam, the peak direction is moved by units of angle L in the reverse direction toward the left (or right) ("c," "d," "e," and "f" of FIG. 4). Here, the maximum number of changes in the reverse direction is 2 Kmax.

By means of the above-described process, the peak direction of the transmission beam is moved within a maximum range of ±Kmax×L ("+" being the right direction and "−" being the left direction) degrees. The values of Kmax and L can be changed to any value by instructions from the outside. FIG. 4 shows an example in which Kmax is set to 2 and in which, after two movements in units of angle L toward the right and four movements in units of angle L toward the left, the peak direction returns to the original initial position ("g" and "h" of FIG. 4).

As shown in FIG. 5, transmission antenna weight control circuit 109 of the present embodiment, upon receiving the decoding results from TPC bit monitor circuit 108, first resets variable K that shows the number of movements of the peak direction to "0" (Step S1), and then determines if the results of decoding TPC bits that are transmitted from the mobile station have a bias toward instructions for increasing the transmission power (Step S2). If the results of decoding TPC bits are biased toward instructions for increasing the transmission power, transmission antenna weight control circuit 109 sets the value of second transmission antenna weights $W''=(w''_1, w''_2, \ldots, w''_N)$ such that the peak direction of the transmission beam is moved by L degrees toward the right (or left) (Step S3). Transmission antenna weight control circuit 109 further increments by "1" the value of variable K that shows the number of movements of the peak direction (Step S4). If the results of decoding TPC bits have a bias toward instructions for decreasing the transmission power, or if there is no bias toward either direction, transmission antenna weight control circuit 109 supplies first transmission antenna weights that have been generated by antenna weight conversion circuit 105 without change as second transmission antenna weights and halts the control process of the transmission beam of the present embodiment.

Transmission antenna weight control circuit 109 next determines whether the value of variable K has reached the maximum number of changes Kmax (Step S5), and if the value has not reached the maximum number of changes Kmax, returns to the process of Step S2 and repeats the processes of Step S2-S5.

When the value of variable K reaches the maximum number of changes Kmax, transmission antenna weight control circuit 109, after resetting the value of variable K (Step S6), determines whether the results of decoding TPC bits that have been transmitted from the mobile station have a bias toward instructions for increasing transmission power (Step S7). If there is a bias toward instructions for increasing transmission power in the results of decoding TPC bits, transmission antenna weight control circuit 109 sets the values of second transmission antenna weights $W''=(w''_1, w''_2, \ldots, w''_N)$ such that the peak direction of the transmission beam moves L degrees toward the left (or the right), which is the opposite of the direction up to this point (Step S8). Transmission antenna weight control circuit 109 further increments by "1" the value of variable K, which indicates the number of movements of the peak direction (Step S9). If the results of decoding TPC bits show a bias toward instructions for decreasing the transmission power, or if there is no bias toward either direction, transmission antenna weight control circuit 109 supplies as output the first transmission antenna weights that have been generated by antenna weight conversion circuit 105 without alteration as second transmission antenna weights and halts the control process of the transmission beam of the present embodiment.

Transmission antenna weight control circuit 109 next determines whether the value of variable K has reached the maximum number of changes 2 Kmax that has been set in advance (Step S10), and if the value of variable K has not reached the maximum number of changes 2 Kmax, returns to the process of Step S7 and repeats the processes of Step S7-S10. If the value of variable K has reached the maximum number of changes 2 Kmax, transmission antenna weight control circuit 109 supplies as output the first transmission antenna weights that have been generated by antenna weight conversion circuit 105 without alteration as the second transmission antenna weights and halts the control process of the transmission beam of the present embodiment.

In FIGS. 4 and 5, an example is shown in which the peak direction of the transmission beam is moved to the right and left by units of angle L, but the angle of movement may be an integer multiple of angle L (other than zero) that has been set in advance. For example, when the peak direction of the transmission beam is at the position +Kmax×L or −Kmax×L, the peak direction may be moved as far as the initial position in one operation.

According to the adaptive antenna transceiving device of the present embodiment, if the results of decoding TPC bits in a prescribed time interval indicate a bias toward instructions for increasing transmission power, the peak direction of the transmission beam can be corrected to the direction of the desired wave mobile station by shifting the peak direction of the transmission beam to the right or left. The present embodiment therefore enables a reduction of the interference power that is applied to other mobile stations that are present in the peak direction due to shifting of the peak direction of the transmission beam from the mobile station that is the object of transmission, and can therefore prevent a decrease in the subscriber capacity of the system.

Second Embodiment

In the adaptive antenna transceiving device of the second embodiment, the transmission beam control procedure by transmission antenna weight control circuit 109 differs from that of the first embodiment. The configuration and operations are otherwise the same as the first embodiment, and redundant explanation is therefore omitted.

Figure 6:
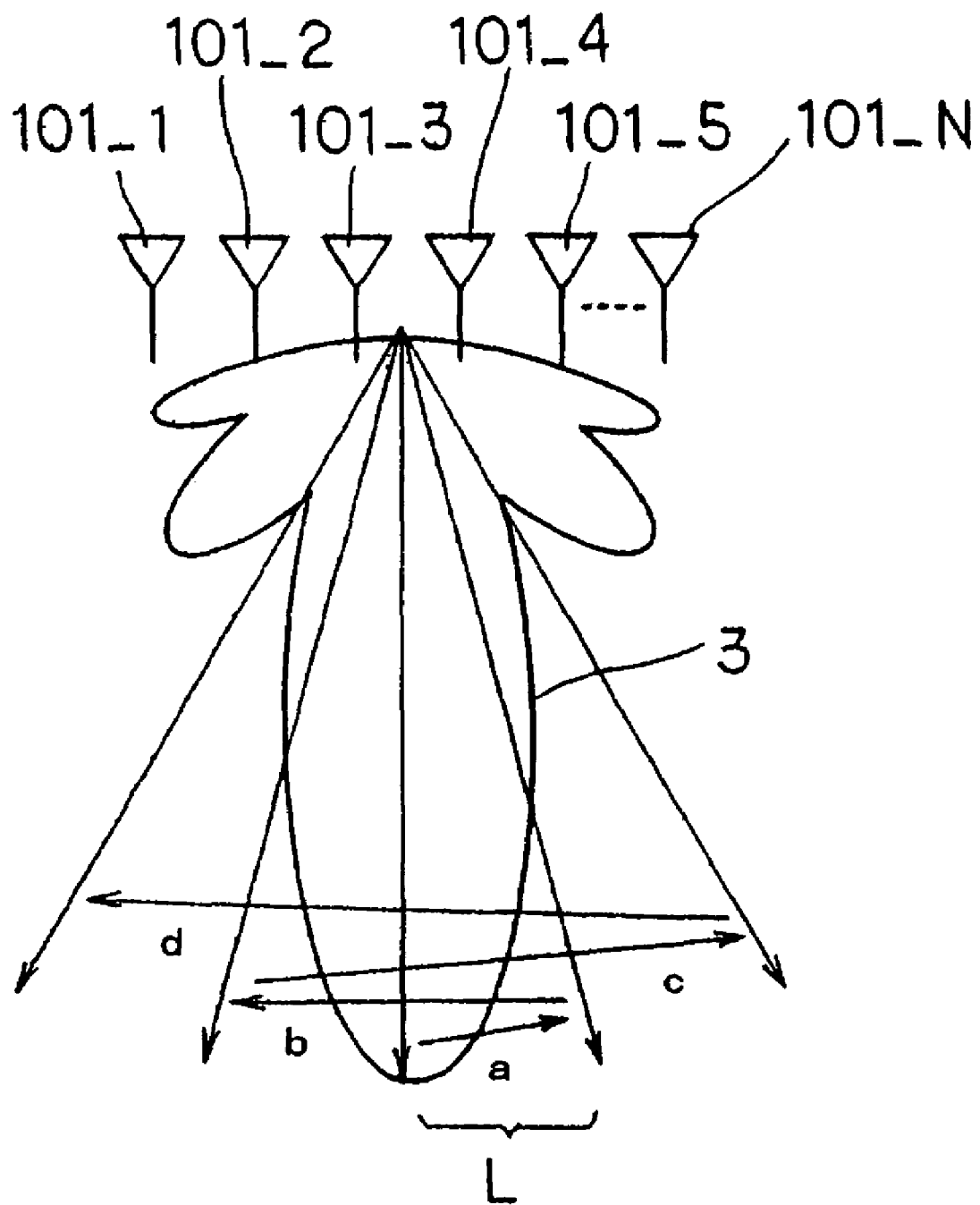
FIG. 6 is a schematic view showing the transmission beam control method of the adaptive antenna transceiving device of the second embodiment.

As shown in FIG. 6, in the adaptive antenna transceiving device of the second embodiment, a process is executed by transmission antenna weight control circuit 109 for alternately moving the peak direction of transmission beam 3 toward the left and right when the results of decoding the TPC bits in a prescribed interval show a bias toward instructions for increasing the transmission power. In the present embodiment, the peak direction is moved toward the right (or toward the left) by angle L that has been set in advance ("a" of FIG. 6) with respect to transmission beam 3 that is formed by first transmission antenna weights $W'=(w'_1, w'_2, \ldots, w'_N)$. If the conditions are not improved (the results of decoding TPC bits show a bias toward instructions for increasing the transmission power), the peak direction is moved by angle 2L toward the left (or right) ("b" of FIG. 6). If the conditions are still not improved, the peak direction is moved by angle 3L toward the right (or left) ("c" of FIG. 6). The same process is further repeated. In this case, the maximum number of changes is assumed to be 2 Kmax that has been set in advance.

Transmission antenna weight control circuit 109 of the present embodiment is provided with a register for holding each of the values of: angle L, which is the unit of movement when moving the peak direction toward the right and left; variable J (a positive integer, initial value=1) for multiplying angle L; variable K (initial value=0) that shows the number of times of movement; and Kmax that is the maximum number of changes (the maximum number of movements).

The above-described process changes the peak direction of the transmission beam within a maximum range of +Kmax×L (where "+" is toward the right and "−" is toward the left) degrees. The values of Kmax and L can be changed to any value by instructions from the outside. FIG. 6 shows an example in which Kmax has been set to 2.

Figure 7:
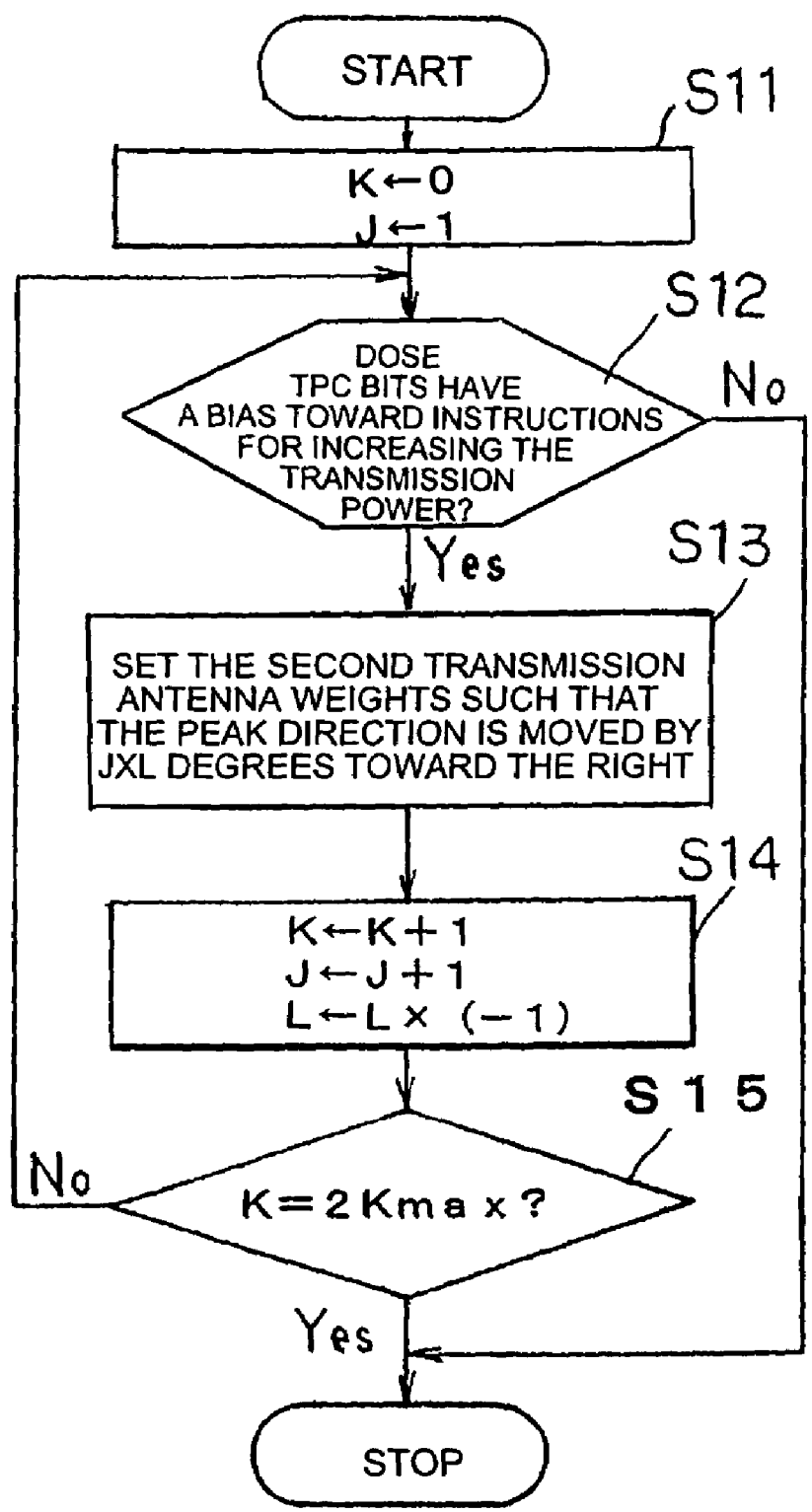
FIG. 7 is a flow chart showing the procedures of the transmission beam control method that is shown in FIG. 6.

As shown in FIG. 7, upon acquiring the decoding results of TPC bit monitor circuit 108, transmission antenna weight control circuit 109 of the second embodiment first resets the value of variable K, which shows the number of times the peak direction has been moved, to "0," and then sets the value of variable J for multiplying angle L to "1" (Step S11).

Transmission antenna weight control circuit 109 next determines whether the results of decoding the TPC bits that are transmitted from the mobile station are biased toward instructions for increasing the transmission power (Step S12), and if the results of decoding the TPC bits are biased toward instructions for increasing the transmission power, transmission antenna weight control circuit 109 sets the values of second transmission antenna weights $W''=(w''_1, w''_2, \ldots, w''_N)$ such that the peak direction of the transmission beam moves +J×L (or −J×L) (Step S13). Transmission antenna weight control circuit 109 next increments by "1" each of the values of variable K that shows the number of movements of the peak direction and variable J for multiplying angle L, and further multiplies angle L by—1 (Step S14). If the results of decoding TPC bits are biased toward instructions for decreasing the transmission power, or if the results are not biased toward either increase or decrease, transmission antenna weight control circuit 109 supplies as output the first transmission antenna weights that have been generated by antenna weight conversion circuit 105 without alteration as second transmission antenna weights and halts the control process of the transmission beam of the present embodiment.

Transmission antenna weight control circuit 109 next determines whether the value of variable K has reached the maximum number of changes 2 Kmax that has been set in advance (Step S15), and if the value of variable K has not reached the maximum number of changes 2 Kmax, transmission antenna weight control circuit 109 returns to the process of Step S12 and repeats the processes of Step S12-S15. However, if the value of variable K has reached the maximum number of changes 2 Kmax, transmission antenna weight control circuit 109 supplies as output the first transmission antenna weights that have been generated by antenna weight conversion circuit 105 without alteration as the second transmission antenna weights and halts the control process of the transmission beam of the present embodiment.

As in the first embodiment, the adaptive antenna transceiving device of the second embodiment can correct the peak direction of the transmission beam to the direction of the desired wave mobile station and thus can reduce the interference power that is applied to other mobile stations that are present in the peak direction that is caused when the peak direction of the transmission beam diverges from the mobile station that is the object of transmission. Accordingly, the adaptive antenna transceiving device of the second embodiment can prevent the reduction of the subscriber capacity of a system.

Third Embodiment

In the adaptive antenna transceiving device of the third embodiment, the control procedure of the transmission beam by means of the transmission antenna weight control circuit differs from that of the first embodiment and the second embodiment. The configuration and operations are otherwise identical to the first embodiment, and redundant explanation is therefore omitted.

In the adaptive antenna transceiving device of the third embodiment, when the results of decoding the TPC bits are biased toward instructions for increasing the transmission power, the width of the main lobe is increased by a preset angle of ±H (where "+" is toward the right and "−" is toward the left) with respect to the transmission beam that is formed by the first transmission antenna weights $W'=(w'_1, w'_2, \ldots, w'_N)$. If the conditions do not then improve (if the results of decoding the TPC bits are still biased toward instructions for increasing transmission power), the width of the main lobe of the transmission beam is again increased by an angle of ±H. The same process is subsequently repeated. In this case, the maximum number of changes is preset as Kmax.

The width of the main lobe of the transmission beam is changed by the above-described process within a maximum range of Kmax×2H degrees. When the width of the main lobe of the transmission beam is increased in this way, the reception power in the mobile station that is the object of transmission increases even if the peak direction of the transmission beam should diverge slightly from the mobile station, thus limiting increase in the transmission power that results from divergence of the peak direction of the transmission beam from the mobile station that is the object of transmission. In addition, because excessive increase of the width of the main lobe in the present embodiment applies interference power to other mobile stations that are present in the vicinity of the desired wave mobile station, angle H and maximum number of changes Kmax are preferably set to minimum values.

Transmission antenna weight control circuit 109 of the present embodiment is provided with a register for holding the values of each of: angle H, which is the unit of change of the main lobe width; variable K that shows the number of changes of the main lobe width; and the maximum number of changes Kmax. The values of Kmax and H can be changed to any value in accordance with instructions from the outside.

Figure 8:
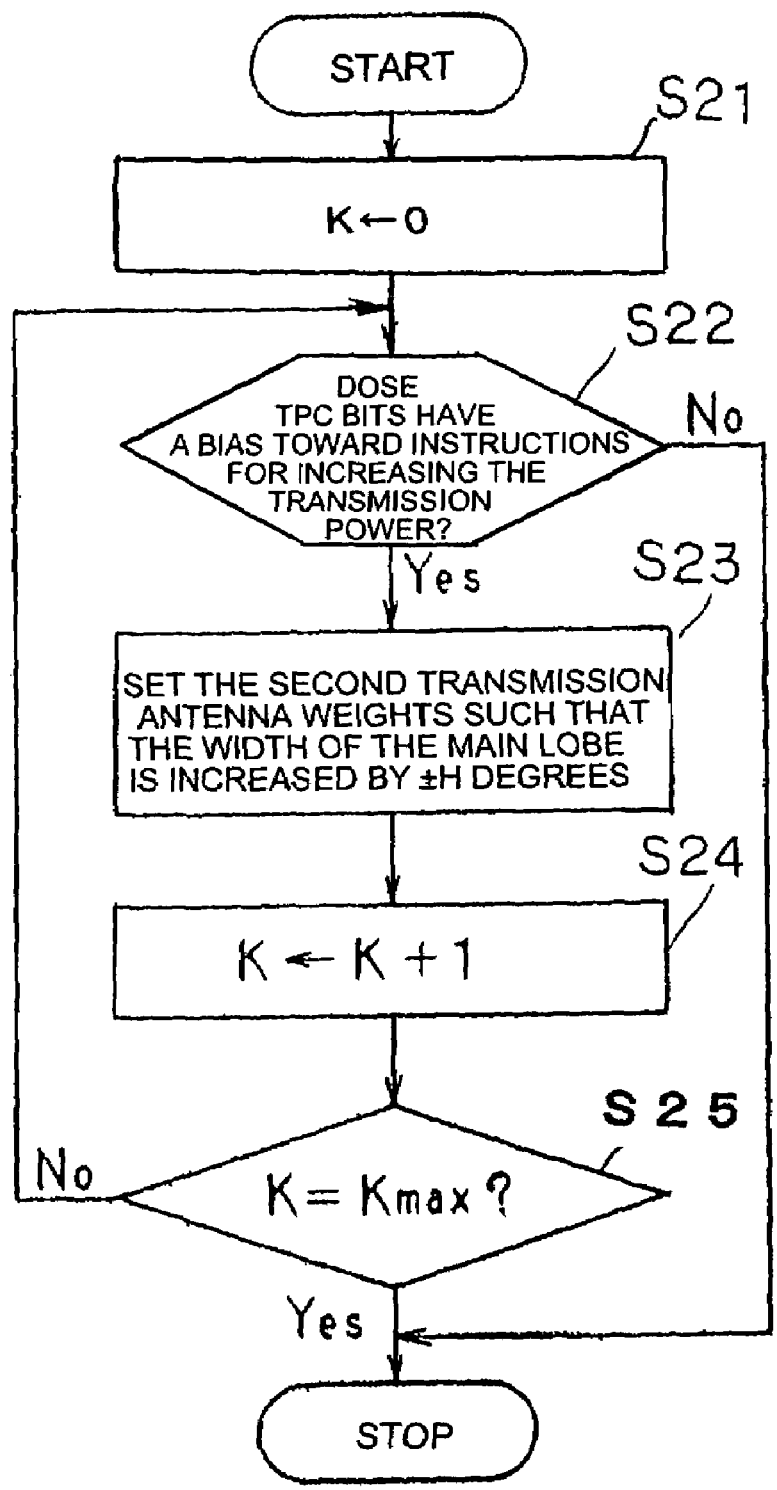
FIG. 8 is a flow chart showing the procedures of the transmission beam control method of the third embodiment.

As shown in FIG. 8, upon acquiring decoding results from TPC bit monitor circuit 108, transmission antenna weight control circuit 109 of the present embodiment first resets the value of variable K that shows the number of changes of the main lobe width to "0" (Step S21), and then determines whether the results of decoding the TPC bits that have been sent from the mobile station are biased toward instructions for increasing the transmission power (Step S22). If the results of decoding TPC bits are biased toward instructions for increasing the transmission power, transmission antenna weight control circuit 109 sets the value of second transmission antenna weights $W'''=(w'''_1, w'''_2, \ldots, w'''_N)$ such that the width of the main lobe of the transmission beam is increased by +H degrees (Step S23). Transmission antenna weight control circuit 109 further increments by "1" the value of variable K that shows the number of changes of the main lobe width (Step S24). If the results of decoding the TPC bits are biased toward instructions for decreasing the transmission power, or if there is no bias toward either increasing or decreasing the transmission power, transmission antenna weight control circuit 109 supplies as output the first transmission antenna weights that have been generated by antenna weight conversion circuit 105 without alteration as the second transmission antenna weights and halts the control process of the transmission beam of the present embodiment.

Transmission antenna weight control circuit 109 next determines whether the value of variable K has reached the maximum number of changes Kmax that has been set in advance (Step S25), and if the value of variable K has not reached the maximum number of changes Kmax, returns to Step S22 and repeats the processes of Step S22-S25. On the other hand, if the value of variable K has reached the maximum number of changes Kmax, transmission antenna weight control circuit 109 supplies as output the first transmission antenna weights that have been generated by antenna weight conversion circuit 105 without alteration as the second transmission antenna weights and halts the control process of the transmission of the present embodiment.

The adaptive antenna transceiving device of the third embodiment limits increase in the transmission power that results when the peak direction of the transmission beam diverges from the mobile station that is the object of transmission and is therefore able to reduce the interference power that is applied to other mobile stations that are present in the peak direction of the transmission beam and prevent decrease of the subscriber capacity of the system.

Fourth Embodiment

In the first to third embodiments, examples were shown in which the peak direction of the transmission beam was controlled by increasing or decreasing the amplitude of transmission data by means of second transmission antenna weights.

Figure 9:
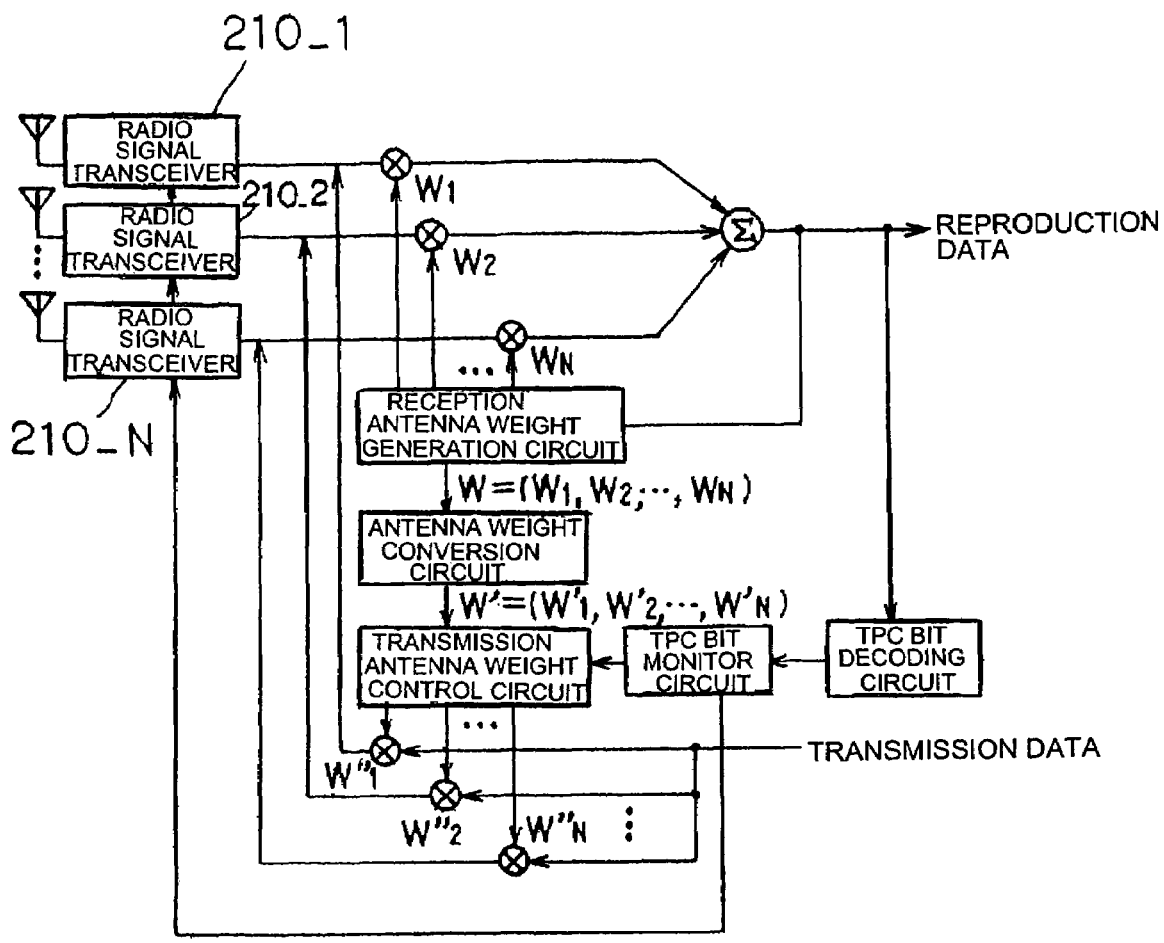
FIG. 9 is a block diagram showing the configuration of the adaptive antenna transceiving device of the fourth embodiment.

However, an adaptive antenna transceiving device can also use the above-described radio signal transceiver to control transmission power. Radio signal transceivers 210_1-210_N are provided with, as RF transmitters, an orthogonal modulator for orthogonally modulating baseband signals, an up-converter for converting baseband signals to radio frequencies, AGC (Automatic Gain Control), and TPA (Transmission Power Amplifier) (these components not being shown in the figure); and, as shown in FIG. 9, radio signal transceivers 210_1-210_N are arranged between antenna devices and transmission-side multipliers.

In the present embodiment, the monitor results of the TPC bit monitor circuit are supplied to radio signal transceivers 210_1-210_N, and as with the transmission antenna weight control circuit that was shown in the first to third embodiments, the power that is supplied to each of the antenna devices is controlled by, for example, the AGC that is provided in radio signal transceivers 210_1-210_N. This configuration can obtain the same effect as the first to third embodiments.

Fifth Embodiment

Figure 10:
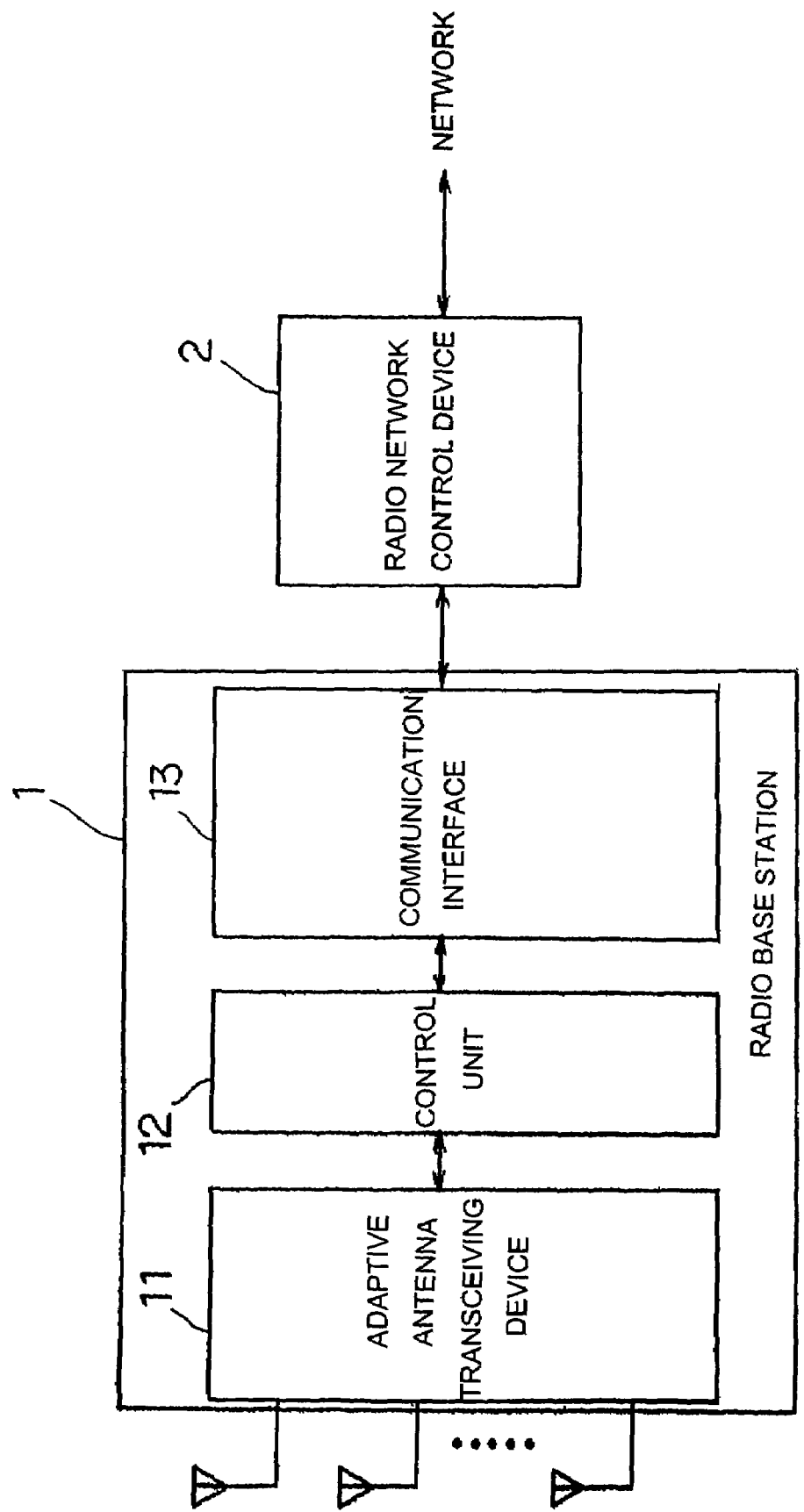
FIG. 10 is a block diagram showing an example of the configuration of a radio base station that is equipped with the adaptive antenna transceiving device of the present invention.

FIG. 10 is a block diagram showing an example of the configuration of a radio base station that is provided with the adaptive antenna transceiving device of the present invention.

As shown in FIG. 10, radio base station 1 of the present embodiment is a construction that includes: adaptive antenna transceiving device 11 that was shown in the first to fourth embodiments; control unit 12 for controlling the operations as a radio base station, such as the multiplexing and separation of the transceiving data for each mobile station and the monitoring of the communication states with each mobile station; and communication interface device 13, which is the interface with radio network control device 2 for both controlling the position of each mobile station and relaying communication between mobile stations and a network by way of a plurality of radio base stations 1.

As in the present embodiment, the use of adaptive antenna transceiving device 11 that was shown in the first to fourth embodiments in radio base station 1 realizes a radio base station that prevents decrease in the subscriber capacity of a mobile communication system.

The invention claimed is:

1. A transmission beam control method for controlling the transmission beam of an adaptive antenna transceiving device that is provided with a plurality of antenna devices; said method comprising:

a first step for extracting, from received signals that have been received by said plurality of antenna devices, TPC bits that are used for controlling transmission power, and decoding from said TPC bits increase/decrease instructions indicating instructions for increasing or instructions for decreasing said transmission power;

a second step for monitoring changes in said increase/decrease instructions in prescribed time intervals that have been set in advance and determining whether or not said increase/decrease instructions are biased toward instructions for increasing said transmission power;

a third step for, when said increase/decrease instructions are biased toward instructions for increasing said transmission power, changing a peak direction of said transmission beam from a prescribed directivity that is formed based on the directivity during reception; and a fourth step for repeating said first step to third step until the bias of said increase/decrease instructions toward instructions for increasing said transmission power is eliminated or until the number of times of changing said transmission beam reaches a maximum value that has been set in advance.

2. The transmission beam control method according to claim 1, wherein, when said increase/decrease instructions are biased toward said instructions for increasing said transmission power, the peak direction of said transmission beam is moved from the same directivity as during reception in angle units that have been set in advance.

3. The transmission beam control method according to claim 2, wherein the peak direction of said transmission beam is moved by integer multiples, other than zero, of an angle that has been set in advance.

4. The transmission beam control method according to claim 2, wherein the movement direction of the peak direction of the transmission beam is changed if the results of decoding TPC bits continue to be biased toward instructions for increasing the transmission power after a predetermined number of movements in one direction.

5. The transmission beam control method according to claim 1, wherein, when said increase/decrease instructions are biased toward instructions for increasing said transmission power, a width of the main lobe of said transmission beam is increased by angle units that have been set in advance.

6. The transmission beam control method according to claim 1, wherein the bias of said increase/decrease instructions toward instructions for increasing said transmission power is eliminated when the TPC bit decoding results repeat in order between instructions for decreasing and instructions for increasing the transmission power.

7. The transmission beam control method according to claim 1, wherein the directivity of the transmission direction is changed to a direction which is not based on the directivity during reception.

8. An adaptive antenna transceiving device for controlling transmission power and directivity of a transmission beam that uses a plurality of antenna devices; said adaptive antenna transceiving device comprising:

a TPC bit decoding circuit for extracting, from received signals that have been received by said plurality of antenna devices, TPC bits that are used for controlling transmission power, and decoding from said TPC bits increase/decrease instructions indicating instructions for increasing or instructions for decreasing said transmission power;

a TPC bit monitor circuit for monitoring changes in prescribed time intervals of said increase/decrease instructions that have been decoded by said TPC bit decoding circuit, and determining whether or not said increase/decrease instructions are biased toward instructions for increasing said transmission power; and a transmission antenna weight control circuit for, when said increase/decrease instructions are biased toward instructions for increasing said transmission power, generating transmission antenna weights that correspond to amplitudes that are supplied to each of said antenna devices such that peak direction of said transmission beam changes from a prescribed directivity that is formed based on the directivity during reception; and repeating the processes for changing the peak direction of the transmission beam until the bias of said increase/decrease instructions toward instructions for increasing said transmission power is eliminated, or until the number of changes of said transmission beam reaches a maximum value that has been set in advance.

9. The adaptive antenna transceiving device according to claim 8, wherein said transmission antenna weight control circuit, when said increase/decrease instructions are biased toward instructions for increasing said transmission power, controls said transmission antenna weights such that the peak direction of said transmission beam moves from the same directivity as during reception in angle units that have been set in advance.

10. The adaptive antenna transceiving device according to claim 9, wherein said transmission antenna weight control circuit controls said transmission antenna weights such that the peak direction of said transmission beam moves in multiples, other than zero, of an angle that has been set in advance.

11. The adaptive antenna transceiving device according to claim 8, wherein said transmission antenna weight control circuit, when said increase/decrease instructions are biased toward instructions for increasing said transmission power, controls said transmission antenna weights such that a width of the main lobe of said transmission beam increases in prescribed angle units from a value that has been set in advance.

12. A radio base station, comprising:

an adaptive antenna transceiving device according to claim 8;

a control unit for monitoring communication states with each mobile station and the multiplexing/separation of transmission/reception data of each mobile station; and a communication interface device, which is the interface with a radio network control device for relaying communication between said mobile stations and a network.

13. An adaptive antenna transceiving device for controlling the transmission beam and transmission power using a plurality of antenna devices; said adaptive antenna transceiving device comprising:

a TPC bit decoding circuit for extracting, from received signals that have been received by said plurality of antenna devices, TPC bits that are used for controlling transmission power;

and decoding from said TPC bits increase/decrease instructions indicating instructions for increasing or instructions for decreasing said transmission power;

a TPC bit monitor circuit for monitoring changes in prescribed time intervals in said increase/decrease instructions that have been decoded at said TPC bit decoding circuit and determining whether or not said increase/decrease instructions are biased toward instructions for increasing said transmission power; and a radio signal transceiver for, when said increase/decrease instructions are biased toward instructions for increasing said transmission power, controlling the power that is supplied to each of said antenna devices such that a peak direction of said transmission beam changes from a prescribed directivity that is formed based on the directivity during reception, and for repeating the processes for changing the peak direction of said transmission beam until the bias of said increase/decrease instructions toward instructions for increasing said transmission power is eliminated or until the number of changes of said transmission beam reaches a maximum value that has been set in advance.

14. The adaptive antenna transceiving device according to claim 13, wherein said radio signal transceiver, when said increase/decrease instructions are biased toward instructions for increasing said transmission power, controls the power that is supplied to each of said antenna devices such that the peak direction of said transmission beam is moved by an angle unit that has been set in advance from the same directivity as during reception.

15. The adaptive antenna transceiving device according to claim 14, wherein said radio signal transceiver controls the power that is supplied to each of said antenna devices such that the peak direction of said transmission beam moves by integer multiples, other than zero, of an angle unit that has been set in advance.

16. The adaptive antenna transceiving device according to claim 13, wherein said radio signal transceiver controls power that is supplied to each of said antenna devices such that, when said increase/decrease instructions are biased toward instructions for increasing said transmission power, a width of the main lobe of said transmission beam is increased by prescribed angle units from a value that has been set in advance.

17. A radio base station, comprising:
an adaptive antenna transceiving device according to claim 13;
a control unit for monitoring communication states with each mobile station and the multiplexing/separation of transmission/reception data of each mobile station; and
a communication interface device, which is the interface with a radio network control device for relaying communication between said mobile stations and a network.

* * * * *